United States Patent [19]

Roue

[11] 4,277,094
[45] Jul. 7, 1981

[54] DEVICE FOR THE REMOTE-CONTROLLED CLOSING OF A GASOLINE VENT

[75] Inventor: Yves Roue, Foyer de Puteaux, France

[73] Assignee: Regie Nationale des Usines Renault, Boulogne-Billancourt, France

[21] Appl. No.: 73,292

[22] Filed: Sep. 7, 1979

[30] Foreign Application Priority Data

Sep. 22, 1978 [FR] France .................. 78 27172

[51] Int. Cl.³ .............................. B60K 15/04
[52] U.S. Cl. ................ 296/1 C; 70/280; 220/86 R; 292/144
[58] Field of Search ........ 296/1 C; 280/5 A; 220/86 R; 70/280, 465; 292/144, DIG. 65, DIG. 43

[56] References Cited

U.S. PATENT DOCUMENTS

| 2,035,895 | 3/1936 | Kelly | 296/1 C |
|---|---|---|---|
| 2,054,145 | 9/1936 | Tandy | 280/5 A |
| 2,149,695 | 3/1939 | Wilhelm | 292/144 |
| 2,499,727 | 3/1950 | Craig | 292/144 X |
| 2,529,361 | 11/1950 | Abbas | 292/DIG. 43 |
| 2,598,670 | 6/1952 | Bentley et al. | 296/1 C |
| 2,910,317 | 10/1959 | Conlee | 292/144 X |
| 3,868,134 | 2/1975 | Jorgensen | 280/5 A |
| 3,912,322 | 10/1975 | Weaver | 296/1 C |
| 3,915,491 | 10/1975 | Montgomery | 296/1 C |
| 3,924,427 | 12/1975 | San Juaquin | 292/144 X |

FOREIGN PATENT DOCUMENTS 2040927 2/1972 Fed. Rep. of Germany .
310119 12/1955 Switzerland .

Primary Examiner—John A. Pekar
Attorney, Agent, or Firm—Oblon, Fisher, Spivak, McClelland & Maier

[57] ABSTRACT

The bolt (6), brought into play by a remote-controlled activator (4), goes into a keeper (8) shaped like a blind stirrup made in the same unit as the portal (3) by passing through the cup of the vent through intermediary fixtures for guiding (13) and for preventing the escape of gasoline vapors (14). An emergency manual control button (21) is provided on the connection between the bolt (6) and the activator core (7).

4 Claims, 1 Drawing Figure

DEVICE FOR THE REMOTE-CONTROLLED CLOSING OF A GASOLINE VENT

BACKGROUND OF THE INVENTION

1. Field of the Invention

The present invention relates to a device for the remote-controlled closing of the gasoline vent of a motor vehicle.

2. Description of the Prior Art

The known processes include locking the external portal or access vent to the gasoline reservoir plug either by means of a lock with a special key or by means of an electric, electromagnetic or pneumatic activator which incorporated in the wiring box of the body and is remotely controlled from centralized command points at the dashboard or in combination with commands for locking the doors and other vehicle openings.

In this case, the activator is mounted in the immediate vicinity of the vent and has a protruding plunger core which locks the filler which is part of the interior wall of the portal.

Such closing presents particular manufacturing difficulties, essentially of three types:

1. Failure of the circuit and/or the activator must be considered a possibility and provided for so the gasoline vent can be opened.
2. The locking system which communicates with the wiring box of the vehicle must not allow gasoline vapors to escape from the reservoir.
3. The locking process must be efficient and not fail upon efforts to break it.

The purpose of the invention is to resolve these difficulties by proposing a particularly carefully studied procedure for locking, preventing the escape of vapors to the rest of the body, and providing emergency command.

To that end, the invention deals with a device for the remote-controlled closing of the gasoline vent of a motor vehicle by means of an activator mounted inside the body and which has a movable core connected with the bolt and capable of locking an interior keeper which is part of the portal to the vent.

In the device the bolt slides through the interior cup of the vent through units for preventing vapor escape and for guiding, both of which fit tightly around the bolt; the keeper is formed by a stirrup which consists of a stud hole ending in a blind housing; and the bolt-activator connection is effected by means of a rod connected to the activator core through an intermediate manual command button which is accessible from inside the vehicle.

As a whole, this system constitutes a simple and easily-mounted closing device which meets the safety demands of current vehicles.

BRIEF DESCRIPTION OF THE DRAWING

The sole FIGURE provided represents a longitudinal cross section of the closing device in the unlocked state.

DETAILED DESCRIPTION OF THE PREFERRED EMBODIMENTS

Figure 1:
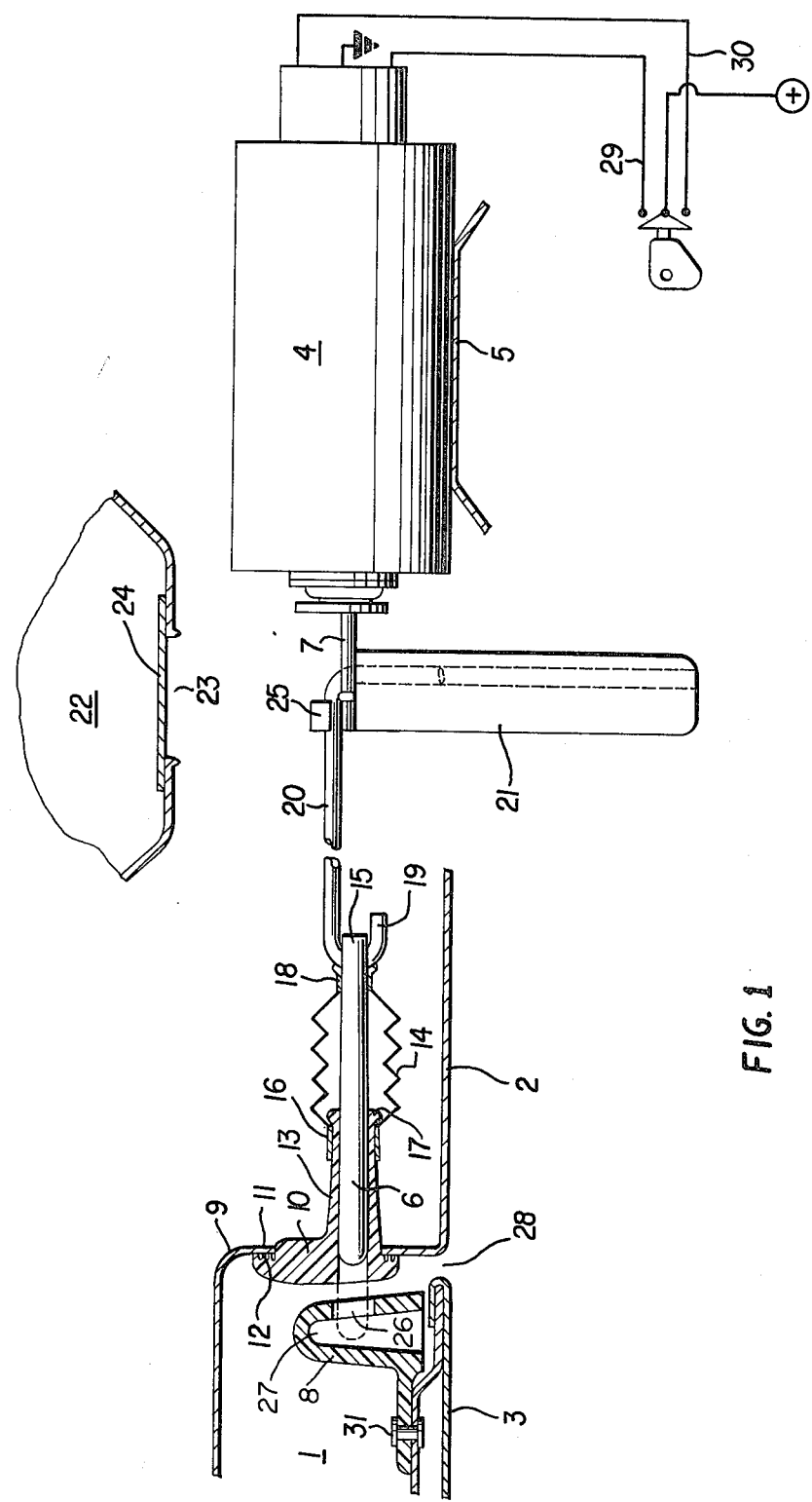

The device is installed near the gasoline vent 1, inside the body 2 and parallel to the pivoting portal 3, giving access to the reservoir plug (not shown). The device consists basically of an activator 4, which may be electromagnetic, which is attached to the sheet metal of the wheel well 5, a sliding bolt 6 moved from a distance by extending the rectilinear movement in either direction of the activator core 7, and a keeper 8 attached on the inside wall of the portal 3.

Moved in the closing direction, the bolt 6 crosses the cup 9 in order to lock the keeper 8 in a self-evident manner.

In accordance with a primary characteristic of the invention, the bolt 6 is a simple blade whose movements through the cup 9 are guided by a perforated plug 10 made of plastic, which obstructs the large opening 11 in the cup, and which features a vapor retention bellows 12 made of an elastic material between the plug and the sheet metal of the cup.

To ensure better guiding, the plug 10 is extended toward the activator by a sleeve 13 surrounding the bolt and molded of a piece with the plug 10.

Preventing the escape of gasoline vapors from the reservoir is accomplished effectively by means of an elastic bellows 14 surrounding the end 15 of the bolt beyond the guide sleeve 13.

The bellows 14 has a small collar at each end, one of which 16 is tight around the end of the sleeve, which has a retaining flange 17, and the other 18 is tight around the end of the bolt, pushing against the hook 19 in the connecting rod 20 between the bolt 6 and the activator core 7.

In accordance with a second characteristic of the invention, a manual emergency command button 21 is attached on the activator-bolt connection. Thus in the event the electric circuit or any mechanical part of the device should fail, the driver can manually override in order to close or unlock the vent by operating lever or button 21, accessible from inside the vehicle.

In the case, for example, of a vent located at the rear of the vehicle and an activator mounted at the level of the rear wheel well, the button 21 would in this case be accessible through the trunk 22 through an opening 23 in the side wall of the trunk and covered by a discrete removable plate 24.

This makes it easier to understand the need for resistance to gasoline vapors described above, particularly because of the connection with the passenger compartment of the vehicle.

The connecting rod 20, which may be quite long, is hooked as seen 19 through the end 15 of the bolt.

The other end of the rod is connected to the protruding end of the activator core 7 through the manual command button 21, one end of which forms a fastening clip 25 and at the same time plays the role of an assembly unit. To show the fastening, the button 21 has deliberately been rotated a quarter turn in relation to the plane of the cross section in the drawing, but in operation the lower part of the button is parallel to the body 2.

According to another characteristic of the invention, the keeper 8 riveted at 31 to the interior wall of the portal 3 consists of a stirrup, preferably of molded plastic, having on one of its hairpin like surfaces a stud hole 26 centered on the bolt 6.

For closing, the bolt goes in the stud hole and ends up in the blind housing 27 of the keeper. The end 6 of the bolt is rounded off to facilitate this introduction.

The boxed form 27 of the keeper improves security, for after locking the end of the pin is not accessible from outside even after introducing a tool in the gap 28 between the portal 3 and the body 2.

Furthermore, the slightly conical shape of the stirrup 8 and the placement of the mounting point 31 of the keeper moved toward the bend in the portal make it possible automatically to close the vent 3 even if the bolt 6 is already in the locked position (dotted lines).

Indeed, one then relies on the strength of the blade of the bolt 6 and on the elasticity of the keeper 8 and the portal 3.

Electronic command of the activator is carried out in a conventional manner by means of an isolated commutator or in combination with the electromagnetic locks for the other points of access to the vehicle, represented schematically here by a key allowing current to be applied as chosen to either the closing circuit 29 or the opening circuit 30 of the different activators, among which is the gasoline vent.

Furthermore, it is worthwhile to provide for an inertial contact which ensures the opening of the activators in the event of a collision as well as for a thermal fuse to protect the circuits and the activators against overheating.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A remote control gasoline vent closing device for a motor vehicle, comprising:
   a vent cup;
   a vent portal for the vent cup, said vent portal including an interior keeper fixed thereto;
   an activator mounted inside the body of said motor vehicle, said activator including a movable core;
   a hollow guide means passing through said vent cup;
   a bolt having one end fixed to said movable core and having another end inserted in said hollow guide means to lock said interior keeper; and
   at least one gasoline vapor retaining means attached between said hollow guide means and said bolt; wherein said guide means is a perforated plug obstructing an opening of said cup and extended in the direction of said activator by a sleeve surrounding said bolt and wherein said gasoline vapor retaining means is an elastic bellows having a collar at each end, one of said collars fits tightly around the end of said sleeve, said sleeve including a retaining flange, and the second of said collars fits tightly around said one end of said bolt.

2. A remote control gasoline vent closing device for a motor vehicle, comprising:
   an activator mounted inside the body of said motor vehicle, said activator including a movable core;
   a vent portal including an interior keeper affixed thereto, said interior keeper comprising a stirrup connected to a tapered blind housing having a stud hole thereon; and
   a bolt having one end fixed to said movable core and movable by said core from an extended position into a retracted position, and having another end insertable into said stud hole to lock said vent portal, whereby said blind housing encloses said other end of said bolt to prevent tampering therewith and said taper of said blind housing permits the closing of said vent portal when said bolt is in said extended position.

3. The vent closing device of claim 2 including a manual emergency command button attached along the connection between said bolt and said activator, said button being accessible from inside said vehicle.

4. Device according to claim 3 wherein said connection is through a rod hooked at one end through the end of said bolt and connected at the other end to one end of said activator core through said manual command button, one end of which serves as an attachment point.

* * * * *